(12) United States Patent
Ragunathan et al.

(10) Patent No.: US 8,676,914 B2
(45) Date of Patent: Mar. 18, 2014

(54) SYNCHRONIZING SERVICES ACROSS NETWORK NODES

(75) Inventors: Ravichandran Ragunathan, Ladera Ranch, CA (US); Attaullah Seikh, Irvine, CA (US); Rajini Bala Giridharagopal, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 1002 days.

(21) Appl. No.: 12/717,862

(22) Filed: Mar. 4, 2010

(65) Prior Publication Data

US 2011/0219093 A1    Sep. 8, 2011

(51) Int. Cl.
  *G06F 15/16*    (2006.01)
(52) U.S. Cl.
  USPC .......................................... 709/207; 709/205
(58) Field of Classification Search
  USPC .......... 709/204, 221, 207; 707/201, 617, 698; 719/317, 330
  See application file for complete search history.

(56) References Cited

U.S. PATENT DOCUMENTS

| | | | | |
|---|---|---|---|---|
| 6,134,603 | A * | 10/2000 | Jones et al. | 719/330 |
| 6,185,611 | B1 * | 2/2001 | Waldo et al. | 709/221 |
| 7,058,655 | B2 * | 6/2006 | Goldberg et al. | 1/1 |
| 7,296,061 | B2 | 11/2007 | Martinez et al. | |
| 7,525,289 | B2 | 4/2009 | Janik et al. | |
| 7,702,668 | B2 * | 4/2010 | Bloesch | 707/617 |
| 2005/0144293 | A1 * | 6/2005 | Limont et al. | 709/228 |
| 2005/0258806 | A1 | 11/2005 | Janik et al. | |
| 2006/0173932 | A1 * | 8/2006 | Cortright et al. | 707/204 |
| 2007/0140213 | A1 * | 6/2007 | Milligan et al. | 370/351 |
| 2007/0192512 | A1 | 8/2007 | Kwon et al. | |
| 2007/0260752 | A1 | 11/2007 | Han et al. | |
| 2008/0065656 | A1 | 3/2008 | Theeten et al. | |
| 2008/0114720 | A1 * | 5/2008 | Smith et al. | 707/2 |
| 2008/0208919 | A1 * | 8/2008 | i Dalfo et al. | 707/201 |
| 2008/0243900 | A1 | 10/2008 | Yohanan et al. | |
| 2008/0275952 | A1 * | 11/2008 | Wang | 709/204 |
| 2009/0204612 | A1 | 8/2009 | Keshavarz-Nia et al. | |
| 2010/0242053 | A1 * | 9/2010 | Nitzsche et al. | 719/317 |
| 2010/0257149 | A1 * | 10/2010 | Cognigni et al. | 707/698 |

OTHER PUBLICATIONS

Sigaev.com. "sync.pl". Oct. 10, 2005. pp. 1-3.*
Administrator. "An introduction to services, runlevels, and rc.d scripts". Jan. 11, 2006. pp. 1-5.*
Cor. "checksum a point-and-click sha1 and md5 hashing application for windows". Feb. 8, 2009. pp. 1-20.*

(Continued)

*Primary Examiner* — Imad Hussain
(74) *Attorney, Agent, or Firm* — Fitzpatrick, Cella, Harper & Scinto

(57) ABSTRACT

A network-enabled device is synchronized with other nodes. Services are run on the device, including at least a node service and a service repository service. Peer nodes on a network are accessed, and a service list which includes services available locally at the network-enabled device and services available remotely at peer nodes is maintained at the service repository service. The node service manages synchronized access to the service list by multicasting a change notification responsive to a change in the services available locally, and by listening to multicasts of change notifications from peer nodes. Responsive to a change in local services, the node service collects a list of local services at the device, generates a SyncGUID by using a hash function applied to the list of services, formats a change notification message which includes the SyncGUID, and multicasts the formatted change notification message to peer nodes on the network.

32 Claims, 6 Drawing Sheets

(56) References Cited

OTHER PUBLICATIONS

V. Modi et al., eds., "Web Services Dynamic Discovery" (WS-Discovery), Committee Specification 01, Version 1.1, pp. 1-50, Oasis, May 14, 2009.

J. Beatty et al., "Web Services Dynamic Discovery" (WS-Discovery), pp. 1-42, Microsoft Corporation, Inc., Apr. 2005.

J. Yu et al., "Integrating UPnP in a Development Environment for Service-Oriented Applications", Industrial Technology, Apr. 21-24, 2008.

C. Li et al., "Combine concept of agent and service to build distributed object-oriented system", Future Generation Computer Systems, vol. 19, Issue 2, pp. 161-171, Dec. 31, 2002.

R. Handorean et al., "Service Provision in Ad Hoc Networks", Dept. of Computer Science, Washington Univ., pp. 1-13, 2003.

C. Lee et al., "Konark: A System and Protocols for Device Independent, Peer-to-Peer Discovery and Delivery of Mobile Services", IEEE Transactions on Systems, Man, and Cybernetics, vol. 33, No. 6, pp. 682-696, Nov. 2003.

E. Guttman et al., "Service Location Protocol" (RFC 2608), Version 2, pp. 1-54, The Internet Society, Jun. 1999.

* cited by examiner

SYNCHRONIZING SERVICES ACROSS NETWORK NODES

FIELD

The present disclosure relates to synchronizing services across network nodes, and more specifically relates to synchronizing services across network nodes using information transmitted from the nodes.

BACKGROUND

In network computing, it is common to discover and catalog software or hardware services that one node on a network might offer to other nodes on the network, such as file conversion services, data streaming services, database services, printing services and the like. These services ordinarily must be synchronized across the nodes, so as to ensure that each node has a catalog of services that is the same as all other nodes on the network.

In one example, each node tracks local changes by incrementing a counter. The node determines that synchronization with another node is necessary if the local counter does not match a counter at the other node.

SUMMARY

One problem with using counters to synchronize services between nodes is that the counters are unable to account for a significant number of events which may occur on the network. For example, a device may reboot or upgrade firmware, or may only occasionally be connected to the network. Such devices, upon reentry into the network, might see a sequence number that is identical to that already in their list of services, but which is identical only by coincidence due to changes in services that occurred during absence from the network. Accordingly, the counter value at a node may be useless, or may lead to errors. Moreover, the counter values do not suggest the type of change or service, and can only prompt another node to request transmission of an entirely new list of services. The resultant frequent transmissions of full service lists between nodes consumes significant bandwidth and network resources.

The foregoing situation is addressed by generating a persistent globally unique identifier (SyncGUID) corresponding to the nature and type of services available at a node, and multicasting a new SyncGUID in the event of a change in the nature or type of services available at the node.

Thus, in an example embodiment described herein, a network-enabled device is synchronized with other nodes on a network. Services are run on the device, including at least a node service and a service repository service. Peer nodes of network-enabled devices on a network are accessed, and a service list is maintained at the service repository service. The service list includes services available locally at the network-enabled device and services available remotely at peer nodes. The node service manages synchronized access to the service list of the service repository service by multicasting a change notification responsive to a change in the services available locally at the network-enabled device, and by listening to multicasts of change notifications from peer nodes. Responsive to a change in services available locally at the network-enabled device, the node service collects a list of services locally at the network-enabled device, generates a SyncGUID by using a hash function applied to the list of services available locally at the network-enabled device, formats a change notification message which includes the SyncGUID, and multicasts the formatted change notification message via the network to peer nodes on the network.

By using a persistent globally unique identifier (SyncGUID) corresponding to the nature and type of services available at a node, it is ordinarily possible to synchronize services while accounting for other events such as reboots, firmware upgrades, and disconnections. Moreover, since the SyncGUID indicates the services available at a node, it is ordinarily possible to reduce the amount of detailed service data transmitted across the network.

This brief summary has been provided so that the nature of this disclosure may be understood quickly. A more complete understanding can be obtained by reference to the following detailed description and to the attached drawings.

DETAILED DESCRIPTION

Figure 1:
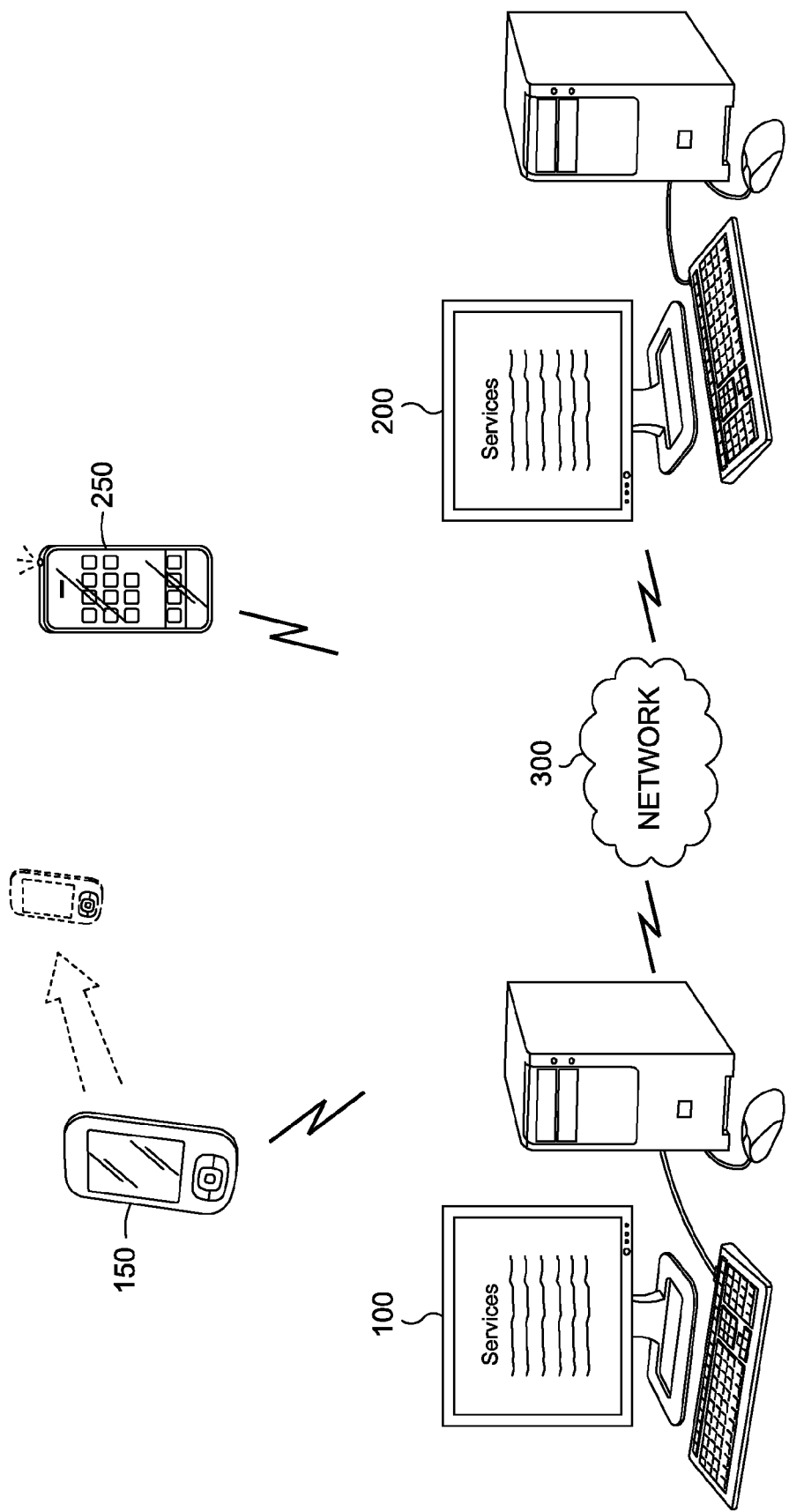
FIG. 1 illustrates an example embodiment of an environment in which aspects of the present disclosure may be practiced.

FIG. 1 illustrates an example environment in which aspects of the present disclosure may be practiced. Computer 100 corresponds to a first node, and generally comprises a programmable general purpose personal computer having an operating system, such as Microsoft® Windows® or Apple® Mac OS® or LINUX, and which is programmed as described below so as to perform particular functions and, in effect, become a special purpose computer when performing these functions.

As shown in FIG. 1, computer 100 displays a list of services on a display screen. Computer 100 is connected to peer nodes PDA 150, computer 200 and mobile phone 250 via network 300. Each peer node may have services which differ from computer 100, and each node may provide these services to computer 100 or another node to thereby realize distributed services across network 300.

While FIG. 1 depicts a computer, computing equipment for practicing aspects of the present disclosure can be implemented in a variety of embodiments. For example, computer 100 can be embodied as a number of devices, including, for example, a personal digital assistant (PDA), a cellular telephone, or a portable media player, among many other embodiments.

Computer 100 also includes computer-readable memory media, such as fixed disk 45 (shown in FIG. 2), which is constructed to store computer-readable information, such as computer-executable process steps or a computer-executable program for causing computer 100 to perform a method for synchronizing services across network nodes, as described more fully below.

PDA 150 is a mobile device which acts as a peer node to computer 100 on network 300. As shown in FIG. 1, PDA 150 is a device which moves in and out of network range of network 300, and thus is only occasionally connected to the network. For example, PDA 150 might be carried by a user into a wireless range of network 300, and then carried out of the wireless range. While a PDA is depicted a device moved in and out of the range of network 300, other types of devices are of course possible.

Computer 200 generally corresponds to computer 100, and also acts as a peer node to computer 100 on network 300. As with computer 100, computer 200 can be embodied as a number of devices, including, for example, a personal digital assistant (PDA), a computer, a cellular telephone, or a portable media player, among many other embodiments.

Mobile phone 250 is another example of a device which may connect to network 300. As shown in FIG. 1, mobile phone 250 may occasionally power on and off, and therefore mobile phone 250 may only occasionally be connected to network 300. For example, a user may occasionally power off mobile phone 250 in certain places or at certain times of day. While a mobile phone is depicted as a device which powers on and off and thus is only sporadically connected to network 300, other types of devices are of course possible.

For purposes of conciseness, only computer 100, PDA 150, computer 200 and mobile phone 250 are shown in FIG. 1, but of course, any number and type of peer nodes may exist on network 300.

Network 300 transmits data between computer 100, PDA 150, computer 200 and mobile phone 250. The implementation, scale and hardware of network 300 may vary according to different embodiments. Thus, for example, network 300 could be the Internet, a Local Area Network (LAN), Wide Area Network (WAN), Metropolitan Area Network (MAN), or Personal Area Network (PAN), among others. Network 300 can be wired or wireless, and can be implemented, for example, as an Optical fiber, Ethernet, or Wireless LAN network. In addition, the network topology of network 300 may vary.

Figure 2:
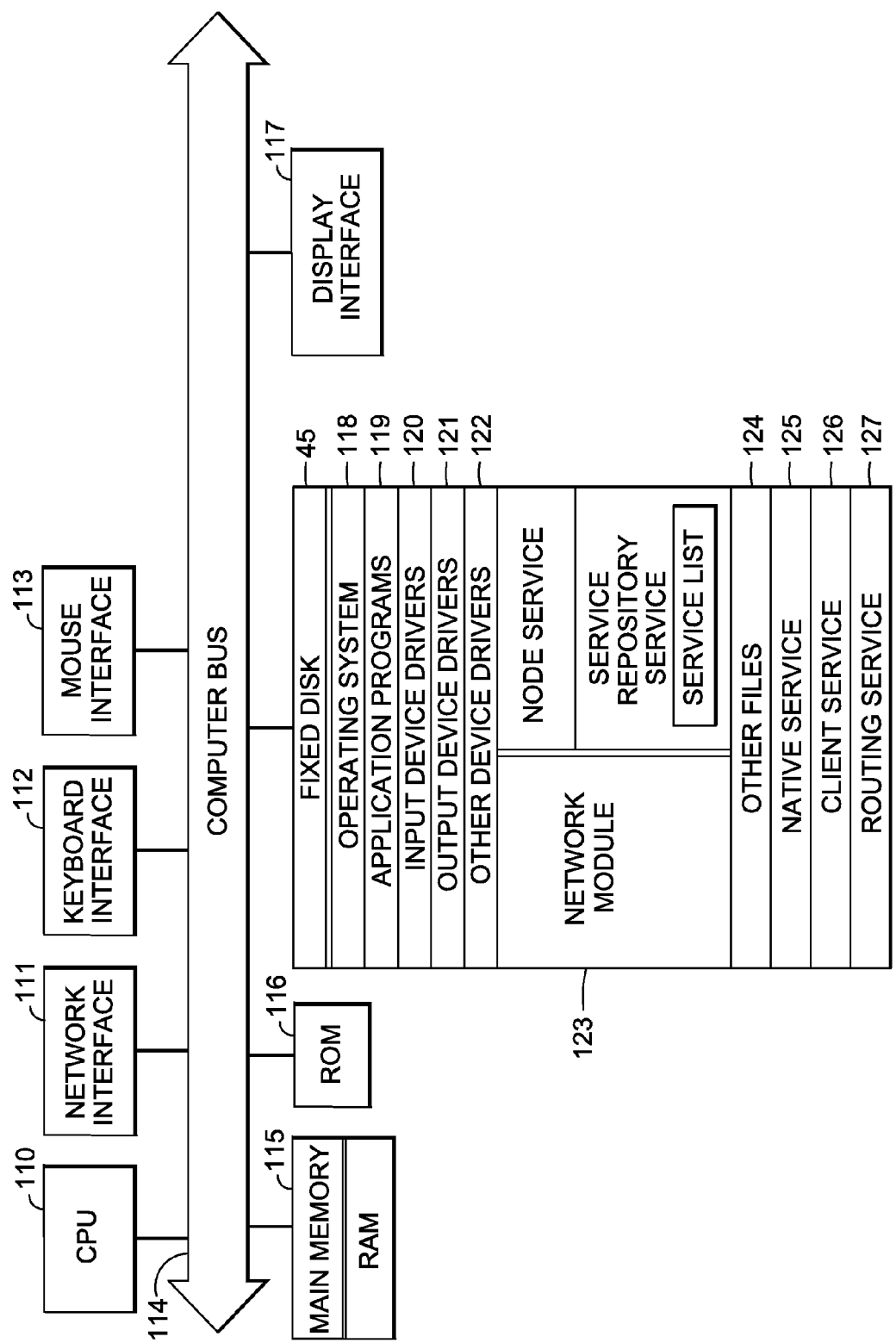
FIG. 2 is a detailed block diagram depicting the internal architecture of the computer shown in FIG. 1.

FIG. 2 is a detailed block diagram depicting the internal architecture of the computer 100 shown in FIG. 1. As shown in FIG. 2, computer 100 includes central processing unit (CPU) 110 which interfaces with computer bus 114. Also interfacing with computer bus 114 are fixed disk 45 (e.g., a hard disk or other nonvolatile storage medium), network interface 111 for accessing other devices across network 300 including peer nodes of network-enabled devices on network 300, keyboard interface 112, mouse interface 113, random access memory (RAM) 115 for use as a main run-time transient memory, read only memory (ROM) 116, and display interface 117 for a display screen or other output.

RAM 115 interfaces with computer bus 114 so as to provide information stored in RAM 115 to CPU 110 during execution of the instructions in software programs, such as an operating system, application programs, image processing modules, and device drivers. More specifically, CPU 110 first loads computer-executable process steps from fixed disk 45, or another storage device into a region of RAM 115. CPU 110 can then execute the stored process steps from RAM 115 in order to execute the loaded computer-executable process steps. Data, such as addresses of peer nodes on network 300, or other information, can be stored in RAM 115 so that the data can be accessed by CPU 110 during the execution of the computer-executable software programs, to the extent that such software programs have a need to access and/or modify the data.

As also shown in FIG. 2, fixed disk 45 contains computer-executable process steps for operating system 118, and application programs 119, such as printing management programs. Fixed disk 45 also contains computer-executable process steps for device drivers for software interface to devices, such as input device drivers 120, output device drivers 121, and other device drivers 122. Other files 124 are available for output to output devices and for manipulation by application programs.

Native service 125 runs on computer 100 and is accessible by other peer nodes on the network. Native service 125 may be added to the service list of the service repository service, triggering a multicast of a change notification by a node service, as described more fully below.

Client service 126 may require a remote service running at a peer node on the network, and the service repository service can access the service list to provide client service 126 with a network address of the peer node and an interface definition for access to the remote service. Additionally, client service 126 may include a connector service (not shown) providing a client application program interface (API) gateway to the node service and the service repository service. The connector service may act as a proxy for dealing with a client application, for example by exposing local or peer services and events such as a service change to a client application.

Routing service 127 may route messages incoming to the network endpoint depending on context, for example in the case that the node service and the service repository service share a common network endpoint on the network-enabled device.

Network module 123 comprises computer-executable process steps for synchronizing services across network nodes, and generally comprises a node service and a service repository service. More specifically, network module 123 is configured to maintain and manage synchronization of a service list which includes services available locally at the network-enabled device and services available remotely at peer nodes such as computer 200. This process will be described in more detail below.

The computer-executable process steps for network module 123 may be configured as part of operating system 118, as part of an output device driver, such as a print processing driver, or as a stand-alone application program. Network module 123 may also be configured as a plug-in or dynamic link library (DLL) to the operating system, device driver or application program. In one example embodiment described herein, network module 123 is incorporated directly into the operating system for computer 100. It can be appreciated that the present disclosure is not limited to these embodiments and that the disclosed modules may be used in other environments.

Figure 3:
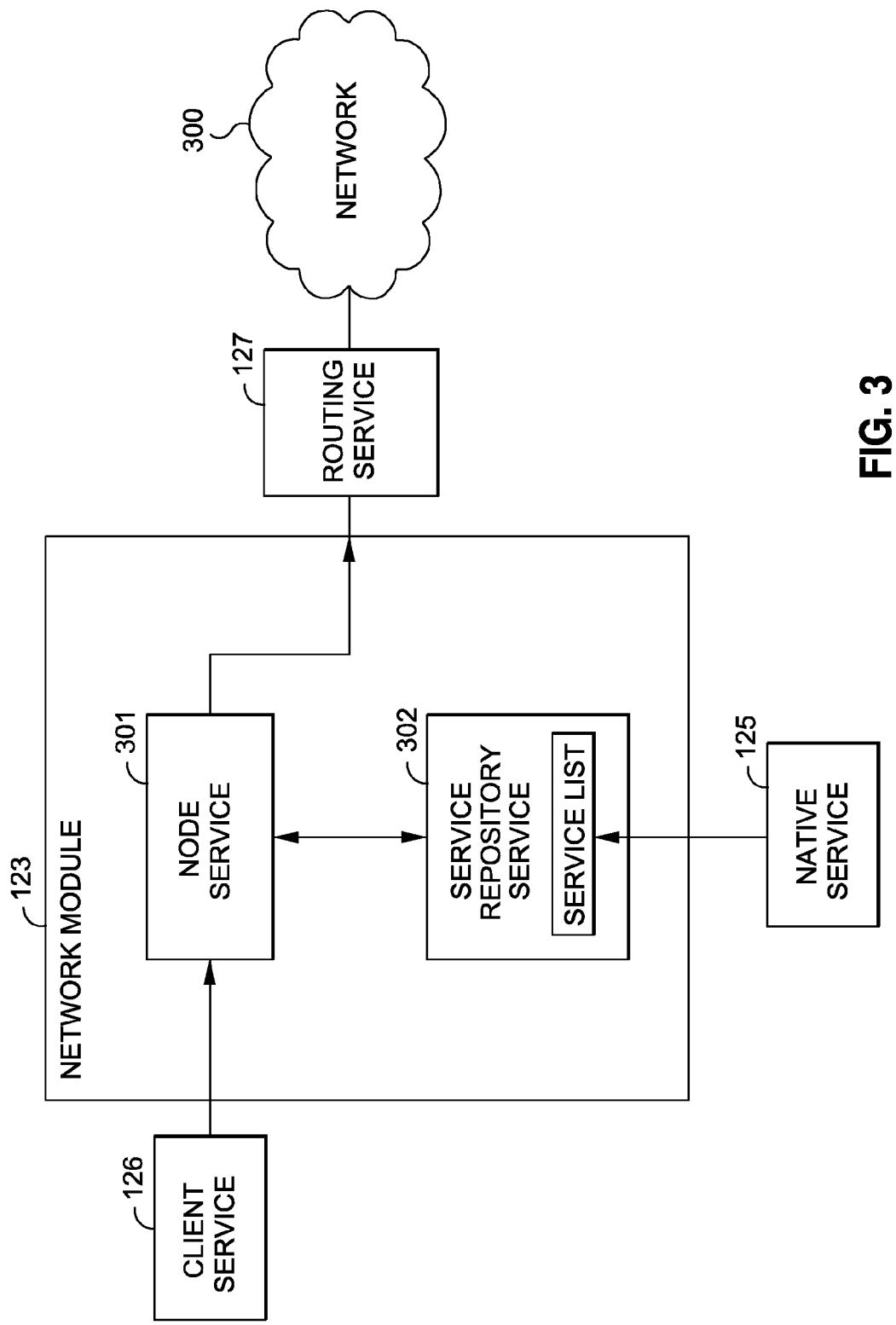
FIG. 3 illustrates an example of a network module.

FIG. 3 illustrates one example of a network module for synchronizing services across network nodes.

In particular, FIG. 3 illustrates an example of network module 123 in which the sub-modules of network module 123 are included in fixed disk 45. Specifically, FIG. 3 illustrates an example of an network module 123 for synchronizing a network-enabled device with other devices on a network. Each of the sub-modules are computer-executable software code or process steps executable by a processor, such as CPU 110, and are stored on a computer-readable storage medium, such as fixed disk 45 or RAM 115. More or less modules may be used, and other architectures are possible.

As shown in FIG. 3, network module 123 includes node service 301. Node service 301 manages synchronized access to the service list at service repository service 302 by multicasting a change notification responsive to a change in available services, and by listening for multicasts of change notifications from peer nodes.

Specifically, node service 301 acts as an "agent" for service repository service 302. Additionally, node service 301 may also keep a list of other node services/service repositories on the network. Each peer node has its own node service.

Upon receiving a change notification from service repository service 302, node service 301 collects a list of services available locally, generates a SyncGUID by using a hash function applied to the list of services available locally at the network-enabled device, formats a change notification message which includes the SyncGUID, and multicasts the formatted change notification message via the network to peer nodes on the network. These processes will be described in more detail below.

Service repository service 302 maintains a service list which includes services available locally at the network-enabled device, and also services available remotely at peer nodes. These services can include, for example, file conversion services, data streaming services, database services, printing services and the like. Each peer node has its own service repository. The actual backend storage of the service entries of the service list can be different for different implementations and platforms. For example, some implementations might use a persistent storage mechanism such as a database, and some might use transient in-memory hash tables.

FIG. 3 also depicts other modules which may interact with network module 123. In particular, as described above, native service 125 is accessible to other peer nodes on network 300, and may be added to the service list of service repository service 302, triggering a multicast of a change notification by node service 301. Client service 126 may require a remote service running at a peer node on network 300, and service repository service 302 can access the service list to provide client service 126 (via node service 301) with a network address of the peer node and an interface definition for access to the remote service. Routing service 127 may route messages incoming to the network endpoint depending on context, for example in the case that node service 301 and service repository service 302 share a common network endpoint on the network-enabled device, as shown in FIG. 3.

Figure 4:
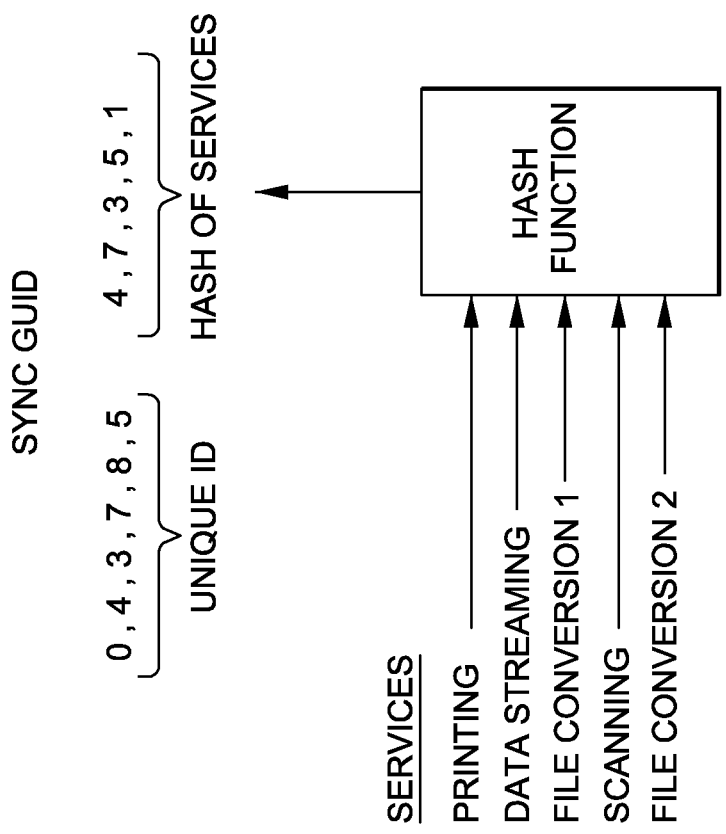
FIG. 4 is a view for explaining a SyncGUID.

FIG. 4 is a view for explaining an example SyncGUID transmitted between peer nodes in order to synchronize services.

As can be seen from FIG. 4, the SyncGUID is comprised of two parts: 1) a unique ID part, and 2) a hash of services available at the node. Of course, more or less digits are possible.

The unique ID part of the SyncGUID can be requested from the operating system or generated according to any system, as long as the ID is unique. For example, the unique ID could be based in part on the time of day, or the network address of the node.

The hash of services is generated by applying a hash function to the services available at the node. A hash function is any well-defined procedure or mathematical function that converts a large, possibly variable-sized amount of data (such as a list of services) into a small datum, usually one or more integers or characters that may serve as an index to an array. The hash function should generate a unique SyncGUID, and should be selected to minimize the occurrence of collisions.

The hash function(s) used to generate the hash from the list of services may include, for example, a Bernstein hash function, a Fowler-Noll-Vo hash function, a Jenkins hash function, a MurmurHash, Pearson hashing, or Zobrist hashing. Numerous other hash functions are available, but for purposes of conciseness will not be described here in further detail.

Peer nodes in the network perform the same hash functions, so as to be able to compare services using the hash. Specifically, a node service runs the same hash function on a list of services for a peer node to generate a resultant hash. Upon receiving a SyncGUID from the peer node, the node service compares the previously-generated resultant hash with a hash extracted from the received SyncGUID.

More specifically, a node service obtains the existing or "old" list of services for the peer node from the service list in the service repository service. The node service then runs a predetermined hash function on the existing or "old" list to generate a hash. The generated hash is then compared with the hash extracted from the received SyncGUID, and a mismatch triggers a request for a new service list, as described more fully below.

A process for synchronizing services between network nodes will now be described with respect to FIG. 5.

Figure 5:
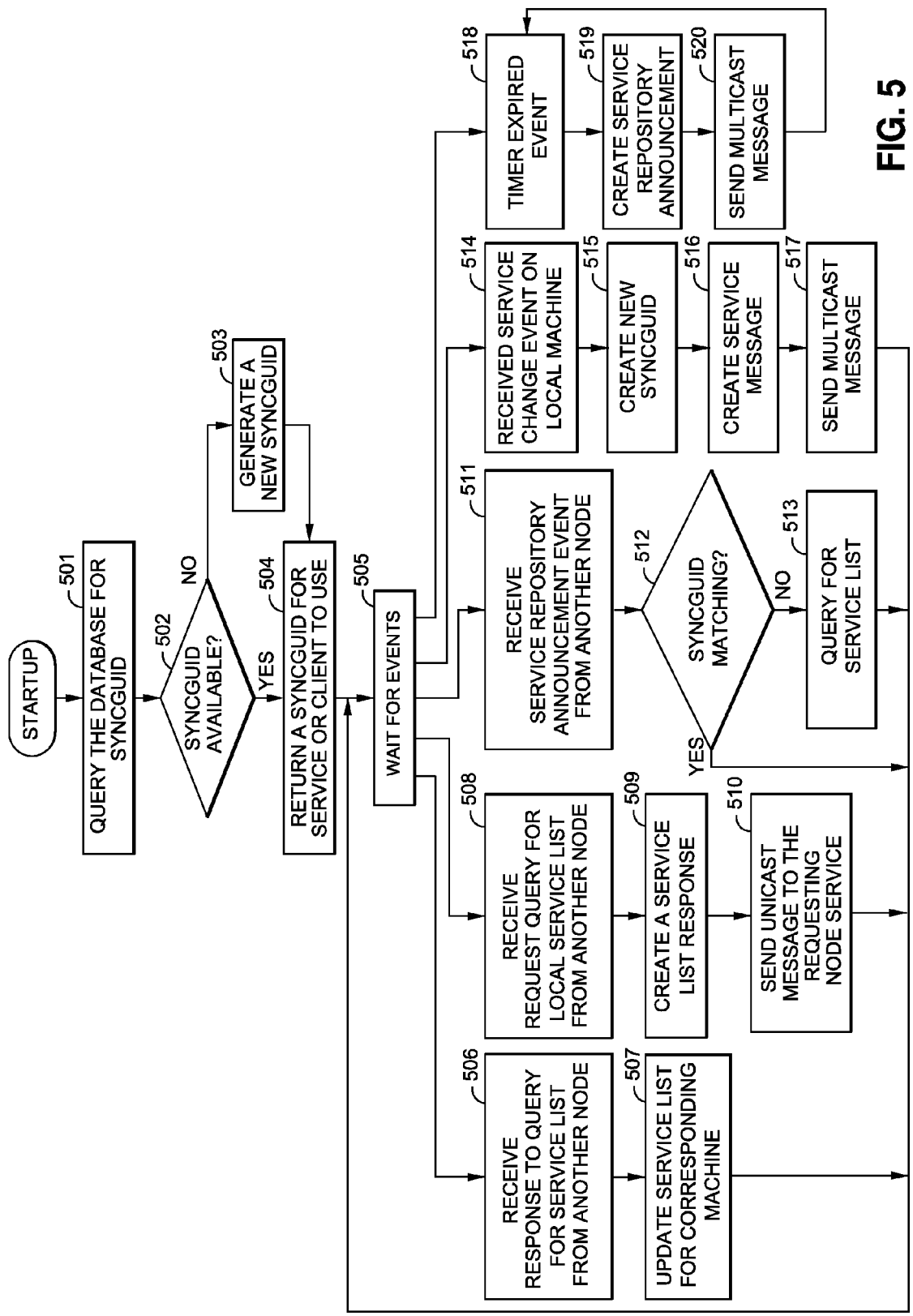
FIG. 5 is a flowchart illustrating an example process for synchronizing services across network nodes.

Briefly, in FIG. 5, a network-enabled device is synchronized with other nodes. Services are run on the device, including at least a node service and a service repository service. Peer nodes on a network are accessed, and a service list which includes services available locally at the network-enabled device and services available remotely at peer nodes is maintained at the service repository service. The node service manages synchronized access to the service list by multicasting a change notification responsive to a change in the services available locally, and by listening to multicasts of change notifications from peer nodes. Responsive to a change in local services, the node service collects a list of local services at the device, generates a SyncGUID by using a hash function applied to the service list, formats a change notification message which includes the SyncGUID, and multicasts the formatted change notification message to peer nodes on the network.

In more detail, in step 501, node service 301 begins upon startup by querying a local database (not shown) to see if a SyncGUID already exists. In that regard, the SyncGUID for each device is persistent across startups, disconnections from the network, etc., and only changes if there has been a change in services. Accordingly, if a SyncGUID already exists in the database, the current SyncGUID may be obtained from the database.

In step 502, node service 301 determines whether the SyncGUID is already available, i.e., whether a SyncGUID for the local device is already available in the database. If not, the process proceeds to step 503. If so, the process proceeds to step 504.

In step 503, node service 301 generates a new SyncGUID. This SyncGUID may include a unique ID requested from the operating system, and may be generated in part by using a hash function applied to a list of services available locally at the network-enabled device, as described above.

In step 504, the stored or newly-generated SyncGUID is returned in response to the query, for use by a service or client.

In step 505, node service 301 waits for events. Numerous events may trigger actions on the part of node service 301. For example, node service 301 may receive a response to its prior query for a service list. In such a case, the process proceeds to step 506. Alternatively, node service 301 may receive a request for a service list from another node. In such a case, the process proceeds to step 508. On the other hand, node service 301 may receive a service repository announcement from another node, in which case the process proceeds to step 511. In still another case, node service 301 may receive a service changed event on the local device, and the process proceeds to step 514. In yet another case, a timer expired event may occur, and the process proceeds to step 518.

In step 506, node service 301 receives a response to its query for a service list from another node. In particular, node service 301 may have previously queried another node in order to update the service list maintained at service repository service 302.

In step 507, node service 301 updates the service list for the corresponding machine by adding the service list information included in the received response. As indicated above, the service list maintained at service repository service 302 includes not only services available locally at the network-enabled device, but also and services available remotely at peer nodes. Node service 301 therefore needs to use the service list response to update the corresponding service list, for example by adding services which are newly available at the peer node. Accordingly, in order to keep the service list current, node service 301 transmits the received service list information to service repository service 302, which updates the service list for the machine at the peer node which transmitted the response. The process then proceeds back to step 505 to continue waiting for events.

In step 508, node service 301 receives a request query for a service list from another node. Thus, in this case, another node requests node service 301 to provide a list of services available locally at the device.

In step 509, node service 301 creates a service list response by querying the service repository for the list of services available at the local device. Service repository service 302 generates a list of services available at the local device, and provides this information to node service 301.

In step 510, node service 301 sends a unicast message to the requesting node service, thus providing the requesting node service with a current list of services available locally at the device. The process then proceeds back to step 505 to continue waiting for events.

In step 511, node service 301 receives a service repository announcement from another node. In this regard, peer nodes may multicast change notification service repository announcements regarding their local services. Alternatively, a node service at another node periodically may issue a service repository announcement, even if there has not been a change in services available locally at the corresponding network-enabled device. A service repository announcement may also be generated and transmitted if a device has newly entered the network or has been started up, among other conditions. The service repository announcement includes the SyncGUID corresponding to the issuing device, and is used to synchronize services between the issuing device and the receiving device.

Specifically, in step 512, node service 301 extracts a SyncGUID from the announcement, and compares the extracted SyncGUID to a SyncGUID for the peer node in service repository service 302.

In that regard, as described above, the SyncGUID may include both an ID section and a hash section. The extracted ID section can be compared simply by comparing the extracted ID section with a stored ID section. The extracted hash section is compared with a resultant hash generated by running a hash function on the existing list of services for that peer node. More specifically, node service 301 obtains the existing or "old" list of services for the peer node from the service list in its service repository service. Node service 301, at some point, runs a predetermined hash function on the existing or "old" list to generate a hash. The generated hash is then compared with the hash extracted from the received SyncGUID. Thus, the extracted SyncGUID may be further verified by comparing the hash of the services in the extracted SyncGUID with the services for the peer node in the local service list.

If the extracted SyncGUID matches the stored SyncGUID for that node (the ID sections match and the extracted hash matches the hash generated from the stored list), then the services in the service list corresponding to the issuing device are current, and there is no need for an update. Thus, the process proceeds back to step 505 to continue waiting for events.

On the other hand, if there is a mismatch between the extracted SyncGUID and the SyncGUID for the peer node in service repository service 302, the service list is outdated, and there is a need to update the service list to correspond for changes in services at that peer node. Accordingly, the process proceeds to step 513.

In step 513, node service 301 issues a query for the service list of the peer node which issued the multicast. In this way, the SyncGUID mismatch acts as a trigger for a local node to "pull" (i.e., request) a service list from the peer node. Once node service 301 has issued the query, the process proceeds back to step 505 to wait for events, one of which may be receiving a response to the aforementioned query in step 506.

In step 514, node service 301 receives a local service change event. Thus, for example, a service such as file conversion, data streaming, or printing may be newly added to the local device. Alternatively, a monitoring service or other service could monitor such calls and generate a service change event based on a live/status process which transmits calls indicating whether the service is alive, leaving the network, having errors, etc. In addition, aspects of a service itself might change, such as a change in IP address or port information, or other custom information. When a service change event is received on the local device, service repository service 302, and in particular the service list, is updated with the change. The process then proceeds to step 515.

In step 515, node service 301 generates a new SyncGUID by using a hash function applied to the list of services available locally at the network-enabled device.

In step 516, node service 301 formats a change notification message which includes the SyncGUID. The message may include, for example, an IP address and MAC address, along with the SyncGUID.

In step 517, node service 301 multicasts the formatted change notification message via the network to peer nodes on the network. The change notification message, and in particular the SyncGUID therein, may subsequently trigger a request for a full service list if there is a mismatch with an already-stored SyncGUID at a peer node. Once the message has been multicast to the peer nodes, the process proceeds back to step 505 to wait for further events.

In step 518, a timer expired event occurs at the local device. In this regard, a node service may periodically multicast the SyncGUID via the network, even if there has not been a change in services available locally at the network-enabled device. To that end, a local timer may measure until a predetermined time has been reached.

In step 519, node service 301 creates a service repository announcement including the SyncGUID.

In step 520, node service 301 multicasts the message including the SyncGUID to peer nodes on the network. The process then proceeds back to step 505 to wait for further events.

Figure 6:
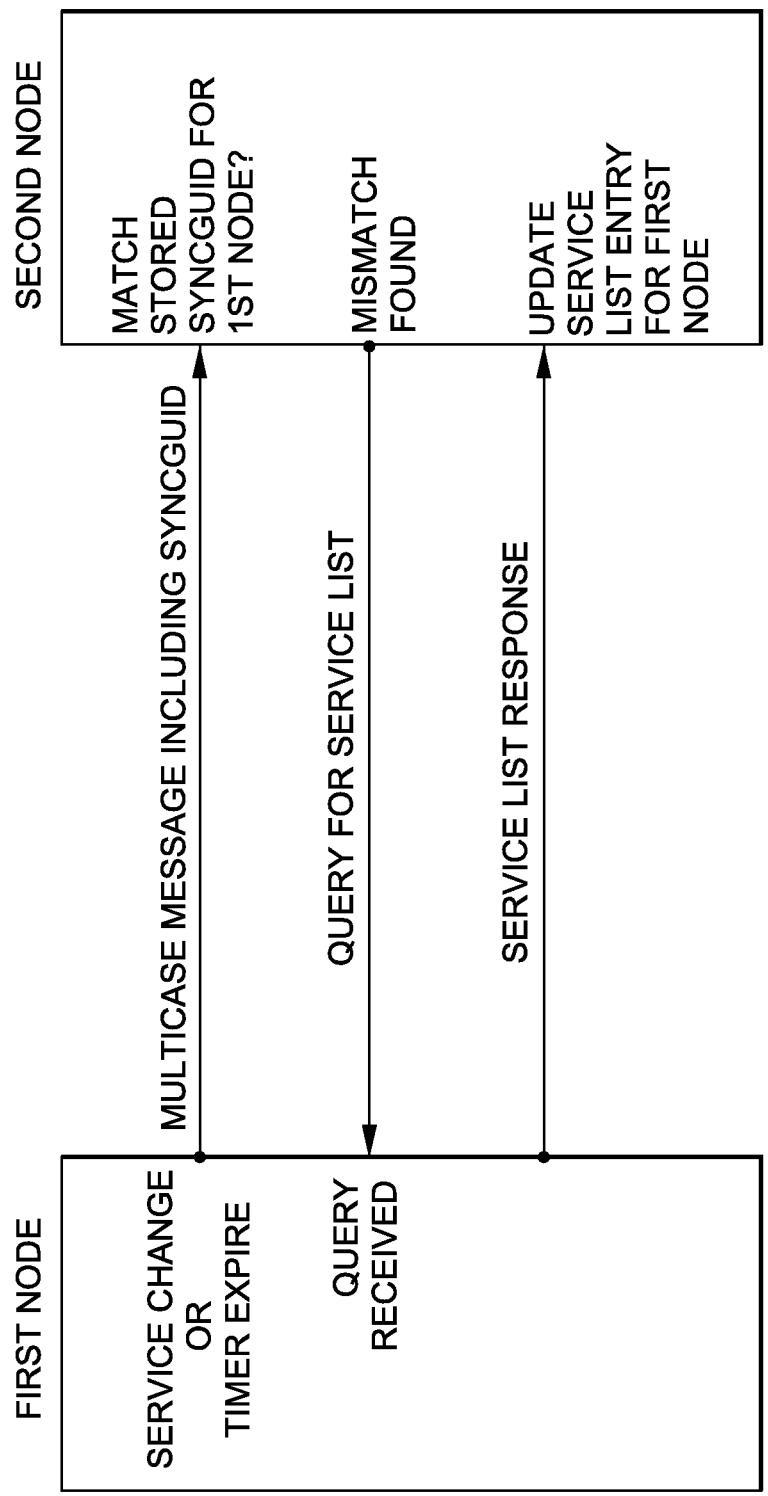
FIG. 6 is a simplified view for explaining service synchronization between a first node and a second node.

FIG. 6 is a simplified view for explaining a synchronization process between a first node and a second node.

Specifically, FIG. 6 depicts a simplified view of events occurring at each node, and the transmissions that either trigger or result from such events. For purposes of conciseness, only first and second nodes are shown, but of course multiple peer nodes on the network are possible.

As seen in FIG. 6, trigger events at the first node include a service change or a timer expire, as described above in steps 514 and 518, respectively. In response to either of these events, the first node transmits a multicast message to peer nodes on the network, including the second node. The multicast message includes the SyncGUID which includes a hash of the services available at the first node.

In response to receiving the multicast message from the first node, the second node extracts the SyncGUID and compares the extracted SyncGUID to a SyncGUID for the peer node in its service repository service.

If the second node finds a mismatch between the extracted SyncGUID (from the multicast message) and the stored SyncGUID for the first node, the second node determines that a service update is necessary from the first node, and transmits a query for a service list to the first node.

Upon receiving the query for the service list, the first node response with a service list response with the service list including the services available at the first node.

Once the second node receives the service list response from the first node, the second node updates the service list entry for the first node in its service list maintained at the service repository service.

By using a persistent globally unique identifier (SyncGUID) corresponding to the nature and type of services available at a node, it is ordinarily possible to synchronize services while accounting for other events such as reboots, firmware upgrades, and disconnections. Moreover, since the SyncGUID indicates the services available at a node, it is ordinarily possible to reduce the amount of detailed service data transmitted across the network.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A network-enabled device, comprising:
    a network interface for access to peer nodes of network-enabled devices on a network; and
    a processor for running services on the network-enabled device, wherein the services include at least a node service and a service repository service,
    wherein the service repository service maintains a service list which includes services available locally at the network-enabled device and services available remotely at peer nodes,
    wherein the node service manages synchronized access to the service list of the service repository service by multicasting a change notification responsive to a change in the services available at the network-enabled device, and by listening for multicasts of change notifications from peer nodes,
    wherein, responsive to a change in services available locally at the network-enabled device, the node service collects a list of services locally at the network-enabled device, generates a SyncGUID including hash information of the list of services available locally at the network-enabled device by using a hash function, formats a change notification message which includes the SyncGUID having the hash information and not having the list of services available locally at the network-enabled device, and multicasts the formatted change notification message via the network to peer nodes on the network, wherein the formatted change notification message does not include the list of services available locally at the network-enabled device, and
    wherein, responsive to receiving a request for an update from a peer node that determines, by verifying the SyncGUID having the hash information included in the multicast formatted change notification received by the peer node, that a service available locally at the network-enabled device has changed, the node service provides the list of services available locally at the network-enabled device to the peer node.

2. The network-enabled device according to claim 1, wherein responsive to receipt of a multicast of a change notification from a peer node, the node service extracts a SyncGUID from the multicast, compares the extracted SyncGUID to a SyncGUID for the peer node in the service repository service, and requests an update from the peer node if there is a mismatch between the extracted SyncGUID and the SyncGUID for the peer node in the service repository service.

3. The network-enabled device according to claim 1, wherein the extracted SyncGUID is further verified by comparing the hash information in the extracted SyncGUID with a hash of services for the peer node in the service list.

4. The network-enabled device according to claim 1, wherein the network-enabled device is only occasionally connected to the network.

5. The network-enabled device according to claim 1, wherein the services running on the network-enabled device further include a native service running on the network-enabled device accessible by other peer nodes on the network, and wherein the native service is added to the service list of the service repository service triggering a multicast of a change notification by the node service.

6. The network-enabled device according to claim 1, wherein the services running on the network-enabled device further include a client service which requires a remote service running at a peer node on the network, and wherein the service repository service accesses the service list to provide the client service with a network address of the peer node and an interface definition for access to the remote service.

7. The network-enabled device according to claim 1, wherein the node service and the service repository service share a common network endpoint on the network-enabled device, and wherein the network-enabled device further includes a routing service that routes messages incoming to the network endpoint depending on context.

8. The network-enabled device according to claim 1, wherein the node service periodically multicasts a notification including the SyncGUID having the hash information and not having the list of services available locally at the network-enabled device via the network, even if there has not been a change in services available locally at the network-enabled device.

9. A method of synchronizing a network-enabled device with other devices on a network, comprising:
    accessing peer nodes of network-enabled devices on the network;
    executing at least a node service and a service repository service on the network-enabled device, wherein the service repository service maintains a service list which includes services available locally at the network-enabled device and services available remotely at peer nodes, wherein the node service manages synchronized access to the service list of the service repository service by multicasting a change notification responsive to a change in the services available locally at the network-enabled device, and by listening to multicasts of change notifications from peer nodes, and
    wherein, responsive to a change in services available locally at the network-enabled device, the method further includes:

collecting by the node service a list of services locally at the network-enabled device;

generating a SyncGUID including hash information of the list of services available locally at the network-enabled device by using a hash function;

formatting a change notification message which includes the SyncGUID having the hash information and not having the list of services available locally at the network-enabled device; and multicasting the formatted change notification message via the network to peer nodes on the network, and wherein, responsive to receiving a request for an update from a peer node that determines, by verifying the SyncGUID having the hash information included in the multicast formatted change notification received by the peer node, that a service available locally at the network-enabled device has changed, the node service providing the list of services available locally at the network-enabled device to the peer node.

10. The method according to claim 9, wherein responsive to receipt of a multicast of a change notification from a peer node, the node service extracts a SyncGUID from the multicast, compares the extracted SyncGUID to a SyncGUID for the peer node in the service repository service, and requests an update from the peer node if there is a mismatch between the extracted SyncGUID and the SyncGUID for the peer node in the service repository service.

11. The method according to claim 9, wherein the extracted SyncGUID is further verified by comparing the hash information in the extracted SyncGUID with a hash of services for the peer node in the service list.

12. The method according to claim 9, wherein the network-enabled device is only occasionally connected to the network.

13. The method according to claim 9, wherein the services running on the network-enabled device further include a native service running on the network-enabled device accessible by other peer nodes on the network, and wherein the native service is added to the service list of the service repository service triggering a multicast of a change notification by the node service.

14. The method according to claim 9, wherein the services running on the network-enabled device further include a client service which requires a remote service running at a peer node on the network, and wherein the service repository service accesses the service list to provide the client service with a network address of the peer node and an interface definition for access to the remote service.

15. The method according to claim 9, wherein the node service and the service repository service share a common network endpoint on the network-enabled device, and wherein the network-enabled device further includes a routing service that routes messages incoming to the network endpoint depending on context.

16. The method according to claim 9, wherein the node service periodically multicasts a notification including the SyncGUID having the hash information and not having the list of services available locally at the network-enabled device via the network, even if there has not been a change in services available locally at the network-enabled device.

17. A network module stored on a non-transitory computer-readable storage medium, for synchronizing a network-enabled device with other devices on a network, the network module comprising:

a service repository service which maintains a service list which includes services available locally at the network-enabled device and services available remotely at peer nodes; and a node service which manages synchronized access to the service list of the service repository service by multicasting a change notification responsive to a change in the services available locally at the network-enabled device, and by listening to multicasts of change notifications from peer nodes, wherein responsive to a change in services available locally at the network-enabled device, the node service collects a list of services locally at the network-enabled device, generates a SyncGUID including hash information of the list of services available locally at the network-enabled device by using a hash function, formats a change notification message which includes the SyncGUID having the hash information and not having the list of services available locally at the network-enabled device, and multicasts the formatted change notification message via the network to peer nodes on the network, wherein the formatted change notification message does not include the list of services available locally at the network-enabled device, and wherein, responsive to receiving a request for an update from a peer node that determines, by verifying the SyncGUID having the hash information included in the multicast formatted change notification received by the peer node, that a service available locally at the network-enabled device has changed, the node service provides the list of services available locally at the network-enabled device to the peer node.

18. The network module according to claim 17, wherein responsive to receipt of a multicast of a change notification from a peer node, the node service extracts a SyncGUID from the multicast, compares the extracted SyncGUID to a SyncGUID for the peer node in the service repository service, and requests an update from the peer node if there is a mismatch between the extracted SyncGUID and the SyncGUID for the peer node in the service repository service.

19. The network module according to claim 18, wherein the extracted SyncGUID is further verified by comparing the hash information in the extracted SyncGUID with a hash of services for the peer node in the service list.

20. The network module according to claim 17, wherein the network-enabled device is only occasionally connected to the network.

21. The network module according to claim 17, wherein the services running on the network-enabled device further include a native service running on the network-enabled device accessible by other peer nodes on the network, and wherein the native service is added to the service list of the service repository service triggering a multicast of a change notification by the node service.

22. The network module according to claim 17, wherein the services running on the network-enabled device further include a client service which requires a remote service running at a peer node on the network, and wherein the service repository service accesses the service list to provide the client service with a network address of the peer node and an interface definition for access to the remote service.

23. The network module according to claim 17, wherein the node service and the service repository service share a common network endpoint on the network-enabled device, and wherein the network-enabled device further includes a routing service that routes messages incoming to the network endpoint depending on context.

24. The network module according to claim 17, wherein the node service periodically multicasts a notification including the SyncGUID having the hash information and not having the list of services available locally at the network-enabled device via the network, even if there has not been a change in services available locally at the network-enabled device.

25. A non-transitory computer-readable storage medium storing computer-executable process steps for causing a computer to perform a method for synchronizing a network-enabled device with other devices on a network, comprising:
  accessing peer nodes of network-enabled devices on the network; and
  executing at least a node service and a service repository service on the device, wherein the service repository service maintains a service list which includes services available locally at the network-enabled device and services available remotely at peer nodes, wherein the node service manages synchronized access to the service list of the service repository service by multicasting a change notification responsive to a change in the services available locally at the network-enabled device, and by listening to multicasts of change notifications from peer nodes,
  wherein responsive to a change in services available locally at the network-enabled device, the method further includes:
  collecting with the node service a list of services locally at the network-enabled device;
  generating a SyncGUID including hash information of the list of services available locally at the network-enabled device by using a hash function;
  formatting a change notification message which includes the SyncGUID having the hash information and not having the list of services available locally at the network-enabled device; and
  multicasting the formatted change notification message via the network to peer nodes on the network,
  wherein, responsive to receiving a request for an update from a peer node that determines, by verifying the SyncGUID having the hash information included in the multicast formatted change notification received by the peer node, that a service available locally at the network-enabled device has changed, the node service providing the list of services available locally at the network-enabled device to the peer node.

26. The computer-readable storage medium according to claim 25, wherein responsive to receipt of a multicast of a change notification from a peer node, the node service extracts a SyncGUID from the multicast, compares the extracted SyncGUID to a SyncGUID for the peer node in the service repository service, and requests an update from the peer node if there is a mismatch between the extracted SyncGUID and the SyncGUID for the peer node in the service repository service.

27. The computer-readable storage medium according to claim 26, wherein the extracted SyncGUID is further verified by comparing the hash information in the extracted SyncGUID with a hash of services for the peer node in the service list.

28. The computer-readable storage medium according to claim 25, wherein the network-enabled device is only occasionally connected to the network.

29. The computer-readable storage medium according to claim 25, wherein the services running on the network-enabled device further include a native service running on the network-enabled device accessible by other peer nodes on the network, and wherein the native service is added to the service list of the service repository service triggering a multicast of a change notification by the node service.

30. The computer-readable storage medium according to claim 25, wherein the services running on the network-enabled device further include a client service which requires a remote service running at a peer node on the network, and wherein the service repository service accesses the service list to provide the client service with a network address of the peer node and an interface definition for access to the remote service.

31. The computer-readable storage medium according to claim 25, wherein the node service and the service repository service share a common network endpoint on the network-enabled device, and wherein the network-enabled device further includes a routing service that routes messages incoming to the network endpoint depending on context.

32. The computer-readable storage medium according to claim 25, wherein the node service periodically multicasts a notification including the SyncGUID having the hash information and not having the list of services available locally at the network-enabled device via the network, even if there has not been a change in services available locally at the network-enabled device.

* * * * *